US006670423B2

(12) United States Patent
Hausmann

(10) Patent No.: US 6,670,423 B2
(45) Date of Patent: Dec. 30, 2003

(54) POLAR ETHYLENE-BASED POLYMER, CYCLOOLEFIN POLYMER BLENDS

(75) Inventor: Karlheinz Hausmann, Auvernier (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 40 days.

(21) Appl. No.: 10/071,028

(22) Filed: Feb. 8, 2002

(65) Prior Publication Data

US 2002/0156195 A1 Oct. 24, 2002

Related U.S. Application Data

(60) Provisional application No. 60/269,899, filed on Feb. 20, 2001.

(51) Int. Cl.[7] .......................... C08L 23/08; C08L 45/00
(52) U.S. Cl. ...................... 525/216; 525/217; 525/221; 525/222; 525/240
(58) Field of Search ............................... 525/221, 222, 525/240, 216, 217

(56) References Cited

U.S. PATENT DOCUMENTS

| 3,264,272 A | 8/1966 | Rees |
| 3,780,140 A | 12/1973 | Hammer |
| 3,941,859 A | 3/1976 | Batiuk et al. |
| 5,087,677 A | 2/1992 | Brekner et al. |
| 5,166,250 A | 11/1992 | Breant |
| 5,371,158 A | 12/1994 | Brekner et al. |
| 5,869,586 A | 2/1999 | Riedel et al. |
| 6,068,936 A | 5/2000 | Peiffer et al. |
| 6,316,560 B1 | 11/2001 | Jacobs et al. |

FOREIGN PATENT DOCUMENTS

| DE | 109225 | 10/1974 |
| EP | 407870 | 1/1991 |
| EP | 485893 | 5/1992 |
| WO | WO 9827126 | 6/1998 |

OTHER PUBLICATIONS

J. Brandrup, E. H. Immergut, Editors, SolubilityParameter Values, Polymer Handbook, 1975, 337–359, Second Edition, John Wiley & Sons, New York.

Dieter Flieger, New Sealants and Peelable Film Concepts, SP'98 Speciality Plastic Films '98 14th Annual World Congress, 1998, Session VI, Düsseldorf, Germany.

Primary Examiner—Nathan M. Nutter

(57) ABSTRACT

Blends comprising a polar derivative of an ethylene based polymer and a cycloolefin polymer are prepared. The ethylene based polymer preferably comprises at least 60 weight % of ethylene, relative to the weight of the polymer and polar monomers selected from the group of carboxylic acids, alkyl acrylates and vinyl acetates. It is preferably 0.01 to 99.5% neutralized with metal ions selected from sodium, potassium, zinc, calcium, magnesium, lithium, aluminum, nickel, and chromium. The cycloolefin polymer is preferably an ethylene-norbornene copolymer. The invention also relates to the applications of such blends as sealant layers and film packagings. The perforation resistance, the heat seal initiation temperature and the hot tack strength of such films are improved.

14 Claims, No Drawings

POLAR ETHYLENE-BASED POLYMER, CYCLOOLEFIN POLYMER BLENDS

This application claims the benefit of U.S. Provisional Application No. 60/269,899, filed Feb. 20, 2001.

FIELD OF INVENTION

The present invention relates to blends comprising a polar derivative of an ethylene based polymer and cycloolefin polymers, and to their applications in sealants for packaging films.

BACKGROUND OF THE INVENTION

In the packaging industry, it is conventional that a product is packaged in a plastic film or a rigid plastic package which is then heat sealed. The film forming the package usually comprises a substrate layer, a tie-layer and a sealant layer. The sealant layer is the topmost layer of the film and is in direct contact with the packaged item. It must have a high perforation resistance, especially for packaging of dry food. The seal must also possess a mechanical resistance sufficient to maintain the tight-seal properties during storage and transport. It is preferable that the package be opened without destroying the integrity of the film itself. In other words, the seal should be peelable, that is to say that it should be easily openable by pulling with hands, without the need of scissors or other instruments.

In addition, in industry, it is desired that these packaging films be suitable for high speed machine packaging. In this view, it is useful to provide a sealant layer that can be sealed at relatively low temperatures and that has a very high hot tack in order to allow for higher packaging line speeds of packaging machines. It would therefore be useful to have sealant layers made out of polymers showing a relatively low heat seal initiation temperature.

It is known to mix cyclic olefinic copolymers and classical polyolefins in order to manufacture sealant layers for packaging films. Nevertheless, the heat seal initiation temperature of those sealant layers are still very high. They are usually around 100° C. Moreover, the perforation resistance of these films is also not satisfactory.

Therefore, there is still a need for sealant layers for packaging films that would have a relatively low heat seal initiation temperature, a good perforation resistance and also a good hot tack value.

SUMMARY OF THE INVENTION

Now, it has been surprisingly found that the combination of two incompatible specific types of polymers lead to a sealant layer showing excellent properties as regards stiffness, perforation resistance, heat seal strength and hot tack strength.

Incompatible polymers, as used herein, means polymers that are not soluble in each other, in other words, polymers having solubility parameters which are significantly different from each other, preferably which differ from at least 0.5 units. Solubility parameters are defined in J Bandrup, E. H. Immergut (Ed), Polymer Handbook, Page IV 337 ff New York, 1975.

A first aspect of the invention is a blend comprising at least a polar derivative of an ethylene based polymer and at least a cycloolefin polymer.

Another aspect of the invention is a film comprising the blend above.

Another aspect of the invention is a sealant layer comprising the above film.

Another aspect of the invention is a packaging comprising the sealant layer above.

Another aspect of the invention is a method for improving the perforation resistance of a film made of a polar derivative of an ethylene based polymer comprising the step of introducing therein from about 0.1 to 50% by weight, relative of the weight of the film, of a cycloolefin polymer.

Another aspect of the invention is a method for reducing the heat seal initiation temperature of a film made of a polar derivative of an ethylene based polymer comprising the step of introducing therein from about 0.1 to 50% by weight, relative of the weight of the film, of a cycloolefin polymer.

Another aspect of the invention is a method for stabilizing the heat seal strength of a film made of a polar derivative of an ethylene based polymer over a wide temperature range comprising the step of introducing therein from about 0.1 to 50% by weight, relative of the weight of the film, of a cycloolefin polymer.

Another aspect of the invention is a method for increasing the hot tack strength of a film made of a polar derivative of an ethylene based polymer range comprising the step of introducing therein from about 0.1 to 50% by weight, relative of the weight of the film, of a cycloolefin polymer.

The film of the invention has improved resistance to impact, improved hot tack value. It can also have a significantly reduced heat seal initiation temperature (see Examples).

Although the ethylene based polymer and the cycloolefin polymer of the invention are incompatible, their combination leads to improved mechanical properties of the film made of their blend. Moreover, when opening the seal, the film made of the blends of the invention have the potential to delaminate and therefore offer a perfectly controlled peel use as well as high perforation resistance, which is an advantage over commercial peel systems which are usually poor in perforation resistance.

The film of the invention shows an excellent perforation resistance. The packagings made of this film are therefore more resistant. This is very important in food packaging, where bones for example may damage the film. It also shows a low seal initiation temperature, which means that packages made of this film can be sealed at lower temperatures than before. This is particularly important in industrial processes where each operation must be rapid. The film of the invention also shows high hot tack strength. That means that the sealing operation, in particular in vertical form fill (VFF) machines and in flow wrapping processes where the goods are packaged under slight overpressure in modified atmosphere (MAP), can be speeded up significantly. One does not have to wait a certain time until the sealing is effective. This also allows more packages to be heat sealed in less time. The film can be wrapped in high speed automatic wrapping machines, increasing the productivity in the industrial processes.

The films of the invention can find use in food packagings like cereals, meat, soup packagings.

DETAILED DESCRIPTION OF THE INVENTION

The first essential component of the composition of the invention is a polar derivative of an ethylene based polymer. "Polar derivative of an ethylene based polymer", as used herein, means an ethylene based polymer where part of the hydrogen atoms in the hydrocarbon chain of polyethylene is substituted by at least one atom chosen from oxygen or nitrogen. This polar derivative of an ethylene based polymer is preferably a copolymer or a terpolymer. It preferably comprises at least 60 weight % of ethylene, relative to the weight of the polymer, and polar monomers selected from the group of carboxylic acids, alkyl acrylates and vinyl acetates.

In a preferred embodiment of the invention, the polar derivative of an ethylene based polymer is of ethylene; α,β-ethylenically unsaturated $C_3$–$C_8$ carboxylic acid, and optionally one or more softening comonomers copolymerizable with ethylene. The α,β-ethylenically unsaturated $C_3$–$C_8$ carboxylic acid is preferably present in an amount of about 5–15 weight %, relative to the weight of the polymer. The softening monomer is preferably present in an amount of less than about 25 weight %, relative to the weight of the polymer. Acrylic and methacrylic acids are preferred acid comonomers. The softening comonomer can be an alkyl acrylate selected from the group consisting of methyl acrylate, n-propyl-, iso-butyl-, n-butyl-, n-octyl-, 2-ethylhexyl- and 2-methoxyethyl-acrylates. The preferred alkyl acrylates are iso-butyl-, n-butyl-, 2-ethylhexyl-, and 2-methoxyethyl-acrylates. The softening comonomer can also be an alkyl vinyl ether selected from the group consisting of n-butyl-, n-hexyl-, 2-ethylhexyl-, and 2-methoxyethyl-vinyl ether. The preferred alkyl vinyl ethers are n-butyl vinyl ether and n-hexyl vinyl ether.

The polymer is optionally about 0.01 to 99.5% neutralized with metal ions selected from groups Ia, Ib, IIa, IIIa, IVa, VIb, and VII of the Periodic Table of Elements such as sodium, potassium, zinc, calcium, magnesium, lithium, aluminum, nickel, and chromium. Such neutralized ethylene acid copolymers are known in the art as 'ionomers'. Typically, neutralization will be from about 10–70%. Preferably the copolymer has from about 35 to about 70% of the carboxylic acid groups ionized by neutralization with metal ions selected from the group consisting of sodium, potassium, zinc, calcium, and magnesium. Ionomers and their methods of manufacture are described in U.S. Pat. No. 3,264,272.

Suitable polymers for use in the present invention are the ionomers commercially available under the trademark Surlyn® from E. I. du Pont de Nemours and Company and the ethylene acid copolymers available under the trademark Nucrele from E. I. du Pont de Nemours and Company.

In another preferred embodiment of the invention, the polar derivative of an ethylene based polymer is of ethylene, alkyl (meth)acrylate and optionally one vinylalkylsilane termonomer or carbon monoxide. The alkyl (meth)acrylate monomer is preferably present in an amount of about 5–40 weight %, relative to the weight of the polymer. The alkyl group of the alkyl (meth)acrylate monomer is preferably methyl but can be a higher alkyl group up to octyl. The vinylalkylsilane termonomer is preferably present in an amount of less than 3 weight %, relative to the weight of the polymer. The preferred vinylalkylsilane termonomers are selected from vinylmethylsilane and vinylethylsilane. The carbon monoxide monomer is preferably present in an amount less than 15 weight %. Relative to the weight of the polymer. Such polymers and their preparation are described in U.S. Pat. No. 3,780,140. These polymers can be prepared by the various methods known in the art such as high pressure free radical polymerization. Suitable polymers for use in the present invention are the products commercially available from E. I. du Pont de Nemours under the trademarks Elvaloy® AC, Elvaloy® HP.

Other polar derivatives of an ethylene based polymer suitable for the present invention are the polymers of ethylene and vinyl acetate commercially available from E. I. du Pont de Nemours under the trademark Elvax®.

The polar derivative of the ethylene based polymer is usually present in the blend of the invention in an amount from about 50 weight % to 99.9 weight %, relative to the weight of the blend.

The second essential component of the blend of the invention is a cycloolefin polymer. Suitable cycloolefin polymers for the invention have a mean molecular weight Mw (weight average) in the range from 200 to 100,000. They are substantially amorphous, i.e. have a crystallinity of less than 5% by weight. They preferably show a glass transition temperature Tg, which is generally in the range from 0 to 300° C. The polydispersity Mw/Mn of the cycloolefin polymers is preferably from 1 to 5.

Cycloolefin polymers (COPs) are homopolymers built up from only one type of cycloolefins or copolymers built up from cycloolefins and comonomers (COCs), where the comonomer content is at most 20% by weight, based on the weight of the cycloolefin polymer. Cycloolefins are mono or polyunsaturated polycyclic ring systems, such as cycloalkenes, bicycloalkenes, tricycloalkenes or tetracycloalkenes. The ring systems can be monosubstituted or polysubstituted. Preference is given to the cycloolefins which are built up from monoalkylated or unsubstituted cycloolefins. Particularly preferred cycloolefin homopolymers are polynorbornene, polydimethyloctahydronaphthalene, polycyclopentene and poly(5-methyl)norbomene. The cycloolefin polymers can also be branched. Products of this type can have comb or star structures.

If desired, the above-described cycloolefins can also be copolymerized with comonomers. In a preferred embodiment of the invention, these cycloolefin copolymers (COCs) contain up to 20% by weight, preferably 1–15% by weight, in particular 1–8% by weight, based on the weight of the COC, of comonomer. Preferred comonomers are olefins having 2 to 6 carbon atoms, in particular ethylene and butylene.

Preferred cycloolefin polymers of the invention are ethylene-norbornene copolymers.

The cycloolefin polymers can be prepared with the aid of transition-metal catalysts. Preparation processes are described, for example, in DD-A-109 225, EP-A-0 407 870, EP-A-0 485 893 and U.S. Pat. No. 5,869,586, 6,068,936 and WO98/27126 which are incorporated herein by way of reference. Molecular weight regulation during the preparation can advantageously be effected using hydrogen. Suitable molecular weights can also be established through targeted selection of the catalyst and reaction conditions. Details in this respect are given in the above mentioned specifications.

Suitable cycloolefin for the invention are the products sold under the trademark Topas® by Ticona.

The cycloolefin polymer is usually present in the blend of the invention in an amount from about 0.1 weight % to 50%, relative to the weight of the blend.

The blend of the invention may comprise the usual additives including plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, for example release agents, and/or mixtures thereof.

The blend of the invention can be prepared by any extrusion process, for instance in the following manner: a blend is prepared by simply mixing the dry components, as a salt and pepper blend. This blend is then compounded in an extruder. The exiting compound is granulated. Alternatively, the blend can also be fed in a film converting extruder without compounding.

The film of the invention can be prepared by extrusion as follows: the granulates obtained as hereinabove are melted in a suitable extruder and converted into a film with at least one individual layer using a converting technique. Suitable converting techniques are for instance blown film extrusion, cast sheet extrusion, extrusion coating.

The incorporation of about 0.1 to 50% of a cycloolefin polymer in a film made of a polar ethylene based polymer according to the invention can have many advantages: it improves the perforation resistance of said film, it reduces its heat seal initiation temperature, it increases its hot tack strength. It can also stabilize its heat seal strength over a wide temperature range, for instance for temperatures ranging from 80° C. to 150° C. It then allows to obtain a low seal strength and an easy openability of the film.

The packaging of the invention may be prepared according to the classical methods of preparation of such packagings made from films.

The invention will be further described in the following Examples.

EXAMPLES

Description of Ingredients

Materials used in the Examples set forth below are as follows, identified by the respective trademarks and trade designations:

Ionomer 1: copolymer of ethylene with 15% methacrylic acid and a melt flow index (MFI) of 0.7, 58% neutralized with Zn, commercially available from E. I. du Pont de Nemours and Company.

Ionomer 2: copolymer of ethylene, with 10% methacrylic acid and MFI of 1.5, 38% neutralized with Zn, commercially available from E. I. du Pont de Nemours and Company.

Elvaloy® AC 2116 : copolymer of ethylene and 16% ethylacrylate, MFI of 1, commercially available from E. I. du Pont de Nemours and Company.

TOPAS® 8007: copolymer of ethylene and norbornene, commercially sold by TICONA

TOPAS® 6013: copolymer of ethylene and norbornene, commercially sold by TICONA

The Melt Flow Index (MFI) of the above compounds is measured according to ASTM D 1238@190° C./2.16 kg.

The following compositions were prepared. All amounts are given in parts by weight relative to the total weight of the composition.

| Composition | 1 | 2 | 3 | 4 | 5 | 6 | 7 | 8 | 9 |
|---|---|---|---|---|---|---|---|---|---|
| Ionomer 1 | 100 | 90 | 80 | 80 | | | | | |
| Ionomer 2 | | | | | 100 | 80 | | | 80 |
| Elvaloy ® AC 2116 | | | | | | | 100 | 80 | |
| Topas ® 8007 | | 10 | 20 | | | 20 | | 20 | |
| Topas ® 6013 | | | | 20 | | | | | 20 |

Compositions 1, 5, and 7 are comparative compositions.
Compositions 2–4, 6 and 8–9 are compositions according to the invention.

The compositions are compounded in a 24 mm PRISM twin screw extruder using a high shear screw. All ingredients were prepared as a salt and pepper blend and granulated after exiting the extruder.

The compounding temperature conditions were as such:

| Feed | Zone 1 | Zone 2 | Zone 3 | Die | Melt |
|---|---|---|---|---|---|
| 205 | 210 | 230 | 240 | 240 | 240 |

Part of the granulate obtained this way is melted in a Brabender 24 mm single screw extruder where a blown film with a thickness between 70 and 100 micrometer was extruded. The melting temperature of the Brabender single screw extruder was as follows:

| Feed | Zone 1 | Zone 2 | Zone 3 | Die | Melt |
|---|---|---|---|---|---|
| 170 | 195 | 220 | 235 | 235 | 235 |

This film was subsequently subjected to the following tests:

Static Perforation Resistance

Static perforation resistance was tested according to the test described in New Sealants and Peelable Film Concepts. Dieter Fleiger, DuPont Europe. SP '98, Specialty Plastic Films '98, 14$^{th}$ Annual World Congress, Oct. 19–21, 1998, Dusseldorf, Germany, Section VI. The film is stretched on a metal plate. It is then subjected to static weight, is positioned on a 90 degree sharp needle. The needle gradually perforates the film. The time which is required to perforate the film is recorded.

For each composition 1 to 6, a film of 100 microns was prepared as described above. Each film was subjected to a static weight of 220 g. For each composition 7 and 8, a film of 70 microns was prepared as described above. Each film was subjected to a static weight of 50 g. The results (time in seconds required to perforate the film) are collected in the following table:

| Composition | 1 | 2 | 3 | 4 | 5 | 6 | 7 | 8 |
|---|---|---|---|---|---|---|---|---|
| Time in sec | 121 | 152 | 860 | 458 | 8 | 157 | 3 | 1896 |

It is clear from these results that the incorporation of a cycloolefin polymer in a film made of a polar derivative of an ethylene based polymer significantly increases its perforation resistance, despite the incompatibility of the two polymers.

Heat Seal Strength Test

For each composition 1, 3, 4, 5, 6, 9, films of 100 microns were prepared as described above. Heat Seal performance has been tested by first heat sealing the films to each other on a Kopp heat sealer at temperatures between 80 and 160° C. using a contact time of 0.5 sec and a pressure of 0.5 MPa. After 24 h the seal strength was measured on a Zwick tensile testing device at a crosshead speed of 100 mm/min. The results are given in N/15 mm, in function of the sealing temperature.

The seal initiation temperature (SIT) is the temperature where the seal strength is >0.5N/15 mm. The SIT measured for the compositions are collected in the following table:

| Composition | 1 | 3 | 4 | 5 | 6 | 9 |
|---|---|---|---|---|---|---|
| SIT in °C. | 80–90 | <80 | <80 | 80–90 | <80 | <80 |

Heat seal initiation temperature is significantly reduced by adding 20% of a cycloolefin polymer to a polar derivative of an ethylene based polymer, despite the uncompatibility of the two polymers. Moreover, the cycloolefin polymers Topas® 8007 and Topas® 6013 are known in the literature to have a melting range between 140–350° C. The ethylene based polymers Ionomer 1 and Ionomer 2 have a melting temperature of 85–95° C. It is therefore unexpected and surprising that a 20% addition of a higher melting material to polar derivatives of ethylene based polymers gives a reduction of the seal initiation temperature of the blend.

In addition the respective behavior of compositions 1 and 3 were compared between 80 and 160° C. For these two compositions, the strength in N/15 mm for various sealing temperatures (ST) comprised between 80 and 160° C. are given in the table below:

| ST in °C. | 80 | 90 | 100 | 110 | 120 | 130 | 140 | 150 |
|---|---|---|---|---|---|---|---|---|
| Composition 1 | 0.60 | 4.50 | 14.16 | 16.00 | 18.00 | 19.00 | 25.00 | 30.00 |
| Composition 3 | 1.36 | 2.30 | 2.73 | 3.36 | 3.32 | 3.60 | 4.26 | 4.90 |

These results show that the incorporation of Topas® 8007 in a composition of Surlyn® 9910 (composition 3) reduces heat seal strength and leads to a very constant low heat seal strength (between 1.36 and 4.90) over a wide temperature field of said composition. On the contrary, the heat seal strength of a composition without Topas® 8007 (composition 1) constantly increases (from 0.60 to 30.00). The level of heat seal strength can be adjusted by the amount of cycloolefin polymer added to a polar derivative of an ethylene based polymer. This feature is characteristic for a highly performing peel blend for easy opening applications.

Hot Tack Strength

Hot tack performance was measured with a commercial Packforsk hot tack testing device in a temperature range between 80 and 110° C. using a dwell time of 0.5 sec and a delay time of 0.1 sec at a pressure of 0.5 MPa. Hot tack was measured on monolayer films.

Compositions 1, 3, 4, 5, 6, 7 and 8 were tested. The results, under the form of the strength in N/15 mm for various sealing temperatures (ST) comprised between 80 and 110° C., are collected in the table below:

| ST in °C. | 80 | 90 | 100 | 110 |
|---|---|---|---|---|
| Composition 1 | 0.20 | 0.65 | 2.22 | 2.80 |
| Composition 3 | 0.98 | 1.46 | 3.93 | 4.20 |
| Composition 4 | 0.56 | 1.70 | 5.10 | 4.20 |
| Composition 5 | 0.40 | 0.50 | 2.30 | 2.40 |
| Composition 6 | 1.23 | 1.98 | 6.00 | 4.33 |
| Composition 7 | 0.70 | 3.03 | 1.36 | — |
| Composition 8 | 1.30 | 3.60 | 2.46 | — |

Compositions 3 and 4 are to be compared to composition 1. Composition 6 is to be compared to composition 5. Composition 8 is to be compared to composition 7. Hot Tack strength of polar derivatives of ethylene based polymers is greatly increased through addition of cycloolefin polymers, despite the incompatibility of the two polymers. Moreover, although cycloolefin polymers have a melting point above 150° C. and polar derivatives of ethylene based polymers of the invention have a melting point of 85–95° C., the addition of 20% cycloolefin polymers to these polar derivatives of ethylene based polymers reduces the minimum temperature where hot tack strength is significantly high, therefore allowing automatic processing of the films made of the blend of the invention.

What is claimed is:

1. A blend comprising incompatible polymers consisting essentially of at least a polar derivative of an ethylene based polymer and at least a non-plasticized cycloolefin polymer.

2. The blend of claim 1, wherein the ethylene base polymer comprises at least 60 weight % of ethylene, relative to the weight of the polymer and polar monomers selected from the group of carboxylic acids, alkyl acrylates and vinyl acetates.

3. The blend of claim 1, wherein the ethylene based polymer is 0.01 to 99.5% neutralized with metal ions selected from sodium, potassium, zinc, calcium, magnesium, lithium, aluminum, nickel, and chromium.

4. The blend of claim 1, wherein the polar derivativ of the ethylene base polymer is present in an amount from 50 weight % to 99.9 weight %, relative to the weight of the blend.

5. The blend of claim 1, wherein the cycloolefin ploymer is built up from cycloolefins and comonomers, where the comonomer content is at most 20% by weight, based on the weight of the cycloolefin polymer.

6. The blend of claim 5, wherein the cycloolefin polymer is an ethylene-norbornene copolymer.

7. The blend of claim 1, wherein the cycloolefin polymer is present in an amount from about 0.1 weight % to 50%, relative to the weight of the blend.

8. A film comprising the blend of claim 1 A blend comprising incompatible polymers comprising essentially of at least a polar derivative of an ethylene based polymer and at least a non-plasticized cycloolefin polymer.

9. A sealant layer comprising the film of claim 8.

10. A packaging comprising the sealant layer of claim 9.

11. A method for improving the perforation resistance of a film made of a polar derivative of an ethylene based polymer comprising the step of introducing therein from about 0.1 to 50% by weight, relative of the weight of the film, of a cycloolefin polymer.

12. A method for reducing the heat seal initiation temperature of a film made of a polar derivative of an ethylene based polymer comprising the step of introducing therein from about 0.1 to 50% by weight, relative to the weight of the film, of a cycloolefin polymer.

13. A method for stabilizing the heat seal strength of a film made of a polar derivative of an ethylene based polymer over wide range temperature comprising the step of introducing therein from about 0.1 to 50% by weight, relative of the weight of the film, of a cycloolefin polymer.

14. A method for increasing the hot tack strength of film made of a polar derivative of an ethylene based polymer comprising the step of introducing therein from about 0.1 to 50% by weight, relative of the weight of the film, of a cycloolefin polymer.

* * * * *

UNITED STATES PATENT AND TRADEMARK OFFICE
CERTIFICATE OF CORRECTION

PATENT NO.     : 6,670,423 B2
DATED          : December 30, 2003
INVENTOR(S)    : Hausmann Karlheinz It is certified that error appears in the above-identified patent and that said Letters Patent is hereby corrected as shown below:

<u>Column 8,</u>
Line 17, delete "base", add "based"
Line 26, delete "derivativ", add -- derivative --
Line 30, delete "polymer", add "polymer"
Line 40, delete "comprising", add "consisting" before "essentially of"
Line 57, add "a" after "over"
Line 60, add "a" after "of"

Signed and Sealed this

Twentieth Day of April, 2004

JON W. DUDAS
*Acting Director of the United States Patent and Trademark Office*